United States Patent
Nambu et al.

(10) Patent No.: US 11,292,474 B2
(45) Date of Patent: Apr. 5, 2022

(54) POWER GENERATION CONTROL DEVICE FOR VEHICLE

(71) Applicant: MITSUBISHI JIDOSHA KOGYO KABUSHIKI KAISHA, Tokyo (JP)

(72) Inventors: Sosuke Nambu, Tokyo (JP); Norihiko Ikoma, Tokyo (JP); Masahiro Mizuno, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 16/439,143

(22) Filed: Jun. 12, 2019

(65) Prior Publication Data

US 2019/0381994 A1 Dec. 19, 2019

(30) Foreign Application Priority Data

Jun. 13, 2018 (JP) .............................. JP2018-112792

(51) Int. Cl.
*B60W 30/20* (2006.01)
*B60W 20/13* (2016.01)
(Continued)

(52) U.S. Cl.
CPC ............ *B60W 30/20* (2013.01); *B60W 10/06* (2013.01); *B60W 10/08* (2013.01); *B60W 20/13* (2016.01);
(Continued)

(58) Field of Classification Search
CPC ................. B60W 20/13; B60W 30/20; B60W 2030/203; B60W 2030/206; B60W 20/10;
(Continued)

(56) References Cited

U.S. PATENT DOCUMENTS 5,967,940 A * 10/1999 Yamaguchi ........... B60W 10/26
477/107
6,435,294 B1 * 8/2002 Hara ....................... B60L 50/16
180/65.25
(Continued)

FOREIGN PATENT DOCUMENTS

EP 2647536 A1 10/2013
JP 11-93725 A 4/1999

OTHER PUBLICATIONS

Extended European Search Report for European Application No. 19179713.3, dated Oct. 15, 2019.

*Primary Examiner* — Robert A Werner
(74) *Attorney, Agent, or Firm* — Birch, Stewart, Kolasch & Birch, LLP

(57) ABSTRACT

A power generation control device includes:
an internal combustion engine of a vehicle;
a generator driven by the internal combustion engine to generate electricity;
a power storage device charged by the generator;
a gear mechanism that interconnects the internal combustion engine and the generator;
a detection unit for detecting vehicle information of the vehicle;
a power generation controller that sets a target power generation amount of the generator based on the vehicle information and calculates a target rotational speed of the internal combustion engine and a load torque of the generator according to the target power generation amount; and
a rattle suppression controller which determines whether a rattle suppression control condition of the gear mechanism is satisfied or not based on the target power generation amount and raises the target rotational speed (Continued)

of the internal combustion engine to a predetermined rotation number when the condition is satisfied.

5 Claims, 11 Drawing Sheets

(51) Int. Cl.
*B60W 10/06* (2006.01)
*B60W 10/08* (2006.01)

(52) U.S. Cl.
CPC . *B60W 2510/244* (2013.01); *B60W 2510/305* (2013.01); *B60W 2520/04* (2013.01); *B60W 2710/0644* (2013.01); *B60Y 2200/92* (2013.01)

(58) Field of Classification Search
CPC ...... B60W 20/15; B60W 20/17; B60W 10/06; B60W 10/08; F02D 31/001

USPC .................................. 701/110; 180/65.265
See application file for complete search history.

(56) References Cited

U.S. PATENT DOCUMENTS

| | | | | |
|---|---|---|---|---|
| 6,569,059 B1* | 5/2003 | Ito | .......................... | B60W 10/06 477/107 |
| 8,167,064 B2* | 5/2012 | Iwase | .................... | B60W 10/06 180/65.265 |
| 2013/0282221 A1* | 10/2013 | Harada | ............... | F02D 41/1497 701/22 |
| 2015/0012159 A1* | 1/2015 | Honda | .................. | B60W 20/00 701/22 |
| 2015/0321659 A1* | 11/2015 | Sato | ......................... | B60K 6/24 701/22 |
| 2017/0305429 A1* | 10/2017 | Natori | .................... | B60W 30/20 |
| 2019/0210587 A1* | 7/2019 | Nishida | ............. | B60W 50/0098 |

* cited by examiner

POWER GENERATION CONTROL DEVICE FOR VEHICLE

CROSS REFERENCE TO RELATED APPLICATION

This application is based on Japanese Patent Application No. 2018-112792 filed on Jun. 13, 2018, the contents of which are incorporated herein by reference.

BACKGROUND OF THE INVENTION

1. Technical Field

The present invention relates to a device mounted on a vehicle for controlling a power generation amount of a generator.

2. Background Art

In recent years, various vehicles which can be driven by an electric motor receiving power from a power storage device, such as an electric car or a plug-in hybrid electric car, have been known (see JP-A-H11-093725). The power storage device is, for example, a battery pack having a plurality of battery modules and is charged by, for example, power generated by driving a generator with an internal combustion engine (engine).

The engine and the generator are connected by a transmission mechanism and engine output is transmitted to the generator. For example, when a crank shaft of the engine and a rotor shaft of the generator are connected by a gear mechanism, slipping in a case where the connection is conducted by, for example, a belt mechanism is suppressed, and thus the output can be further reliably transmitted.

A power generation amount (target power generation amount) by the generator is set by the sum of an amount of power for travelling, an auxiliary device power consumption amount, and a battery charge amount and fluctuates according to a value of each power amount.

The amount of power for travelling is a power amount necessary to drive an electric motor when the vehicle travels and is zero when, for example, the vehicle is stopped or an accelerator is released. The auxiliary device power consumption amount is a power amount necessary to operate other electrical components such as various auxiliary devices, an air conditioner, an audio device, a navigation system. The battery charge amount is a power amount necessary to charge a battery pack to a target power storage amount when the power storage amount of the battery pack is lowered. The target power storage amount is set as a power storage state (remaining capacity) for full charge.

When the target power generation amount of the generator fluctuates, the rotational speed and the torque of the engine and the generator are changed to cope with the fluctuation of the target power generation amount.

For example, when the target power generation amount is small, a load torque of the generator may be extremely reduced. Then, when the engine rotates in a state where the load torque of the generator is extremely reduced, the generator becomes in a state of a co-rotation where almost no load is applied to the engine side.

In this case, since almost no load is applied from the generator side to the engine side, in a gap (backlash) between gears in the gear mechanism, contact and separation of the gears are repeated by transmitting vibration from the engine.

As a result, rattling noise may occur when the gears come in contact with each other. The rattling noise becomes remarkable as the engine rotational speed is low and an engine sound becomes relatively small and a user may misidentify it as a failure of the vehicle.

The invention is made based on this and an object thereof is to provide a power generation control device capable of suppressing a user from misidentifying rattling noise generated by a gear mechanism connecting an engine and a generator as a failure of a vehicle.

SUMMARY OF THE INVENTION

According to one embodiment, a power generation control device includes:

an internal combustion engine of a vehicle;

a generator driven by the internal combustion engine to generate electricity;

a power storage device charged by the generator;

a gear mechanism that interconnects the internal combustion engine and the generator;

a detection unit for detecting vehicle information of the vehicle;

a power generation controller that sets a target power generation amount of the generator based on the vehicle information and calculates a target rotational speed of the internal combustion engine and a load torque of the generator according to the target power generation amount; and a rattle suppression controller which determines whether a rattle suppression control condition of the gear mechanism is satisfied or not based on the target power generation amount and raises the target rotational speed of the internal combustion engine to a predetermined rotation number when the condition is satisfied.

According to the power generation control device of the invention, it is possible to suppress a user from misidentifying rattling noise generated by the gear mechanism connecting the engine and the generator as failure of a vehicle. It is possible to suppress the rattling noise generated by the gear mechanism connecting the internal combustion engine and the generator

BRIEF DESCRIPTION OF THE DRAWINGS

FIGS. 7A and 7B are views illustrating, as an example, respective fluctuation aspects in a case where the power generation amount and the engine rotational speed are switched stepwise in the power generation control device according to the embodiment of the invention, wherein FIG. 7A is a view illustrating the fluctuation aspect of the power generation amount and FIG. 7B is a view illustrating the fluctuation aspect of the engine rotational speed;

FIGS. 12A to 12C are views illustrating, as an example, fluctuation aspects of a target power generation amount and a target rotational speed in the rattle suppression control when the SOC reaches a target power storage amount in the power generation control device according to the embodiment of the invention, wherein FIG. 12A is a view showing the fluctuation aspect of the SOC and FIG. 12B is a view showing the fluctuation aspect of the target power generation amount, and further FIG. 12C is a view showing the fluctuation aspect of the target rotational speed.

DETAILED DESCRIPTION OF THE EMBODIMENTS

Hereinafter, a power generation control device according to an embodiment of the invention will be described with reference to FIGS. 1 to 12C. The power generation control device according to the embodiment is a device which controls a rotational speed of an internal combustion engine and a load torque of a generator under predetermined conditions based on a power generation amount of the generator mounted on a vehicle.

Figure 1:
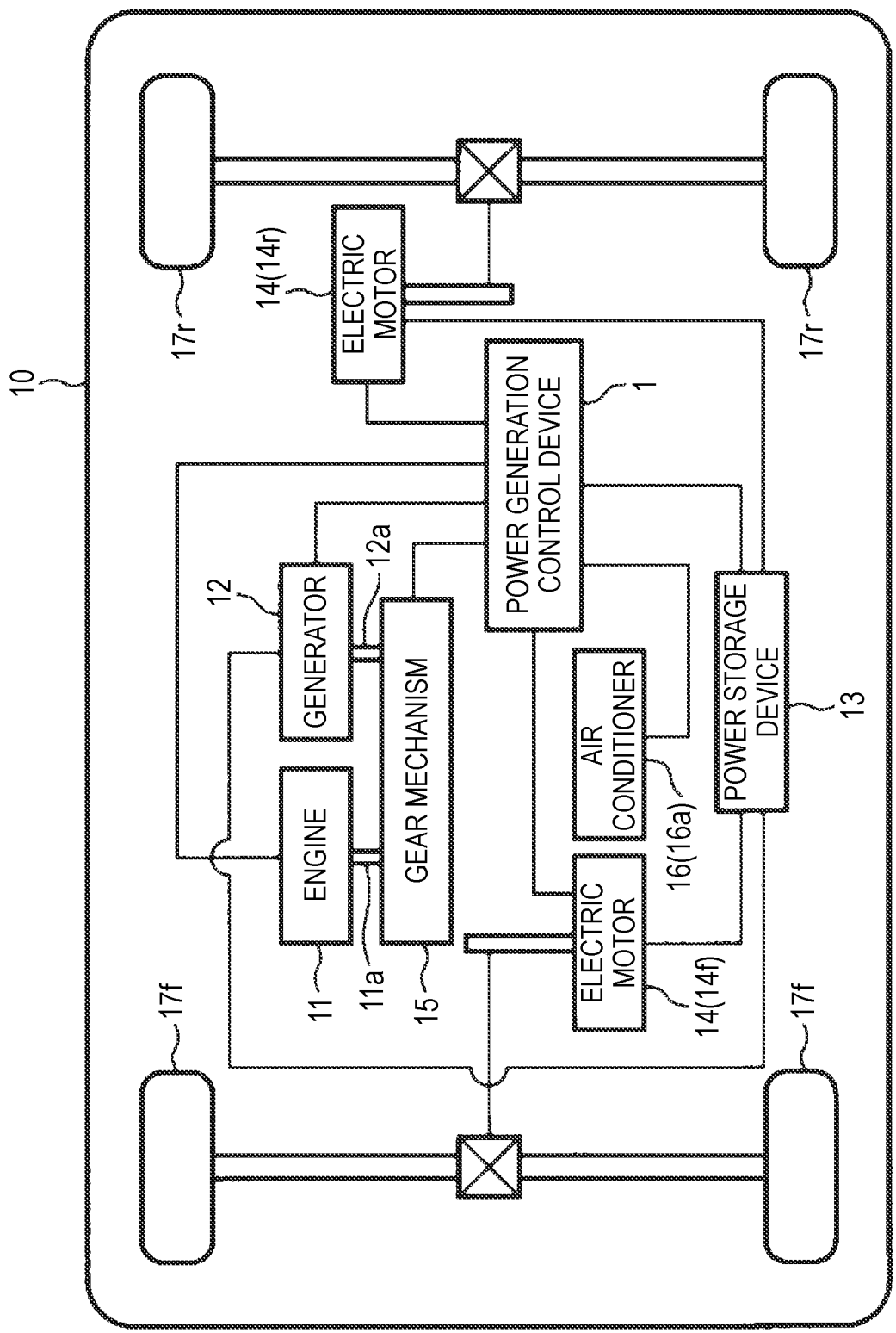
FIG. 1 is a schematic view of a vehicle equipped with a power generation control device according to an embodiment of the invention.

FIG. 1 is a schematic view of a vehicle 10 equipped with a power generation control device 1 according to the embodiment. The vehicle 10 includes an internal combustion engine (hereinafter referred to as an engine) 11, a generator 12, a power storage device 13, an electric motor 14, a gear mechanism 15, and an air conditioner 16.

As illustrated in FIG. 1, the vehicle 10 is an electric vehicle which can be driven by the electric motor 14 receiving power from the power storage device 13 and is, for example, a plug-in hybrid electric vehicle (PHEV), an electric vehicle (EV), or the like. FIG. 1 illustrates an example of the configuration of a PHEV in which an engine 11 is mounted in addition to the electric motor 14. As long as the vehicle is such an electric vehicle described above, it may be a passenger car for private use or a business car such as a truck or a bus and there is no particular limitation on its use and vehicle type.

The engine 11 drives a drive wheel and the generator 12. However, the engine 11 may be configured to drive only the generator 12. The drive wheels may be either front wheels 17f or rear wheels 17r, or all of them (four wheels).

The generator 12 is driven by the engine 11 and generates power for charging the power storage device 13 and power directly supplied to the electric motor 14 without passing through the power storage device 13. The power generation amount of the generator 12 can be adjusted by changing the load torque with an inverter (not illustrated).

The power storage device 13 is configured to include a plurality of battery modules configured by a large number of cells (secondary batteries). Each cell of the power storage device 13 is charged by receiving (fed) power at least from the generator 12, receiving regenerative power of the electric motor 14, or the like. In this case, the power storage device 13 is charged by manually or automatically switching to a plurality of charge modes having different charging modes. The charge mode includes, for example, a charge mode for charging the power up to near full charge, a save mode for maintaining a predetermined power storage amount, a normal mode which is a normal charge state other than those, and the like. In any of the modes, the necessary amount of power is appropriately generated based on the amount of power for travelling, the amount of power consumed by auxiliary devices, and the amount of battery charge. The amount of power for travelling is an amount of power necessary for driving the electric motor 14 when the vehicle 10 travels and is, for example, zero when the vehicle is stopped or the accelerator is released. The amount of power consumed by auxiliary devices is an amount of power necessary to operate various auxiliary devices, the air conditioner 16 (heater 16a), and other electrical components such as an audio and a navigation system. The amount of battery charge is an amount of power necessary to charge the power storage device 13 to a predetermined amount (hereinafter referred to as a target charge amount) when the power storage amount (SOC: State Of Charge) of the power storage device 13 is reduced. The target power storage amount is a target value of the power storage amount and is set as a power storage rate (remaining capacity) for full charge. Since the target power storage amount varies depending on the charge mode, the battery charge amount also varies depending on the charge mode.

The electric motor 14 receives power from the power storage device 13 and drives the drive wheels of the vehicle 10. In the embodiment, the electric motor 14 includes a front wheel drive motor (front motor) 14f which drives front wheels 17f and a rear wheel drive motor (rear motor) 14r which drives rear wheels 17r. However, the front motor 14f and the rear motor 14r may be integrated and configure a drive mechanism of the vehicle 10 with one electric motor. In addition, the drive mechanism may include only one of the front motor 14f and the rear motor 14r as the electric motor 14.

Gears of the gear mechanism 15 makes a crankshaft 11a of the engine 11 connected with a rotor shaft 12a of the generator 12 and transmits the power of the engine 11 to the generator 12.

The air conditioner 16 is a device for adjusting the temperature in a vehicle interior by user's operation or automatically and includes the heater 16a for heating. In the heater 16a, for example, the heating intensity such as air volume and temperature can be set to several levels (High, Middle, Low, etc.) and the temperature of the vehicle interior is raised using the engine 11 as a heat source. Therefore, at the time of operation (heating) of the heater 16a, it is necessary to increase the temperature of the engine 11, which is a heat source, in other words, the rotational speed of the engine 11, as the heating intensity is higher.

Figure 2:
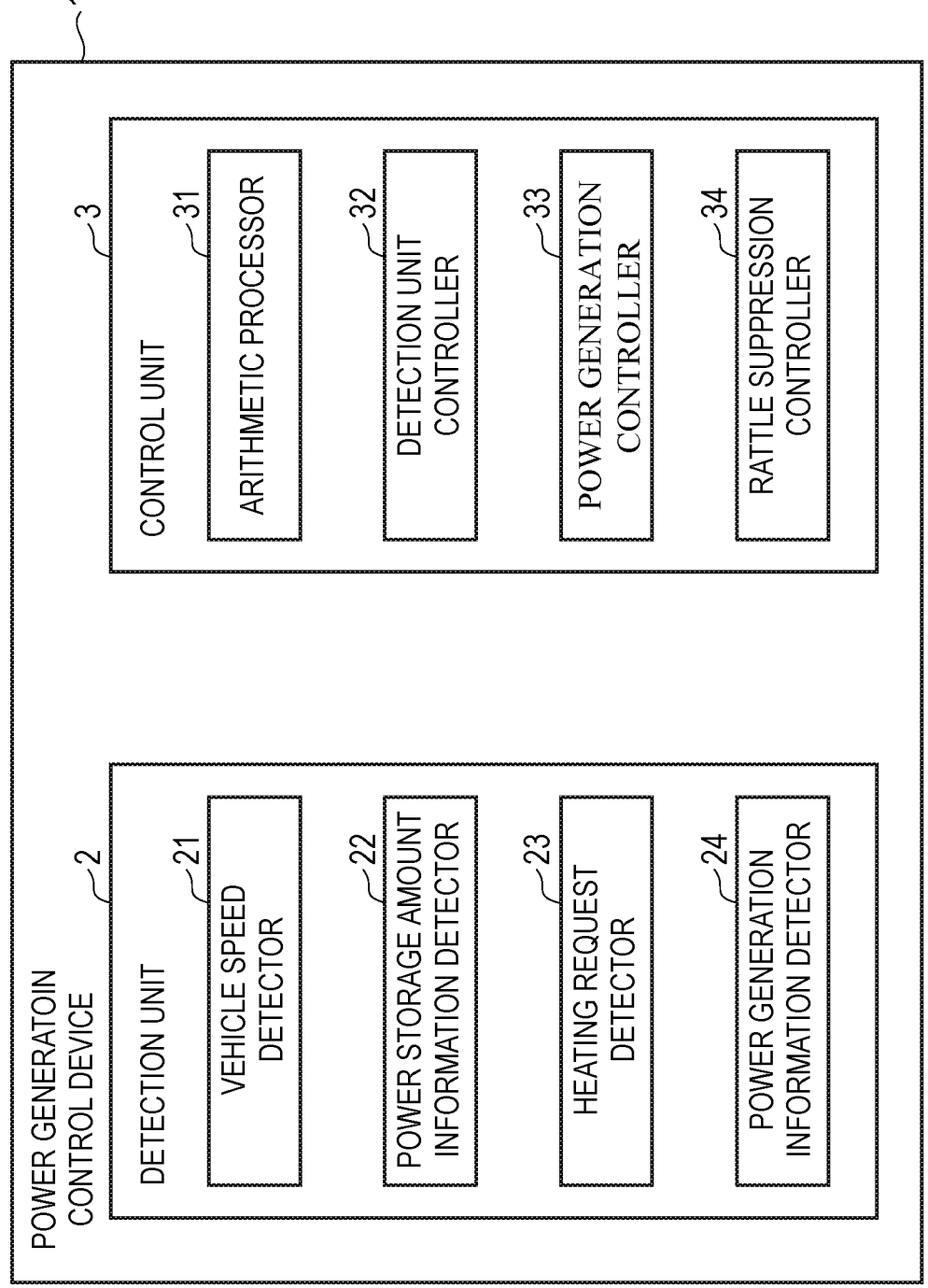
FIG. 2 is a block diagram illustrating a schematic configuration of the power generation control device according to the embodiment of the invention.

FIG. 2 is a block diagram of the power generation control device 1 according to the embodiment. As illustrated in FIG. 2, the power generation control device 1 includes a detection unit 2 and a control unit 3. The detection unit 2 is connected to the control unit 3 in a wired or wireless manner and the operation of the detection unit 2 is controlled by the control unit 3. The detection unit 2 of which the operation is controlled by the control unit 3 detects various types of vehicle information and gives a detection result to the control unit 3.

In order to perform various types of detection necessary for power generation control, the detection unit 2 includes a vehicle speed detector 21, a power storage amount information detector 22, a heating request detector 23, and a power generation information detector 24. Those units are configured as various sensors, a camera, a monitor, and the like.

Figure 3:
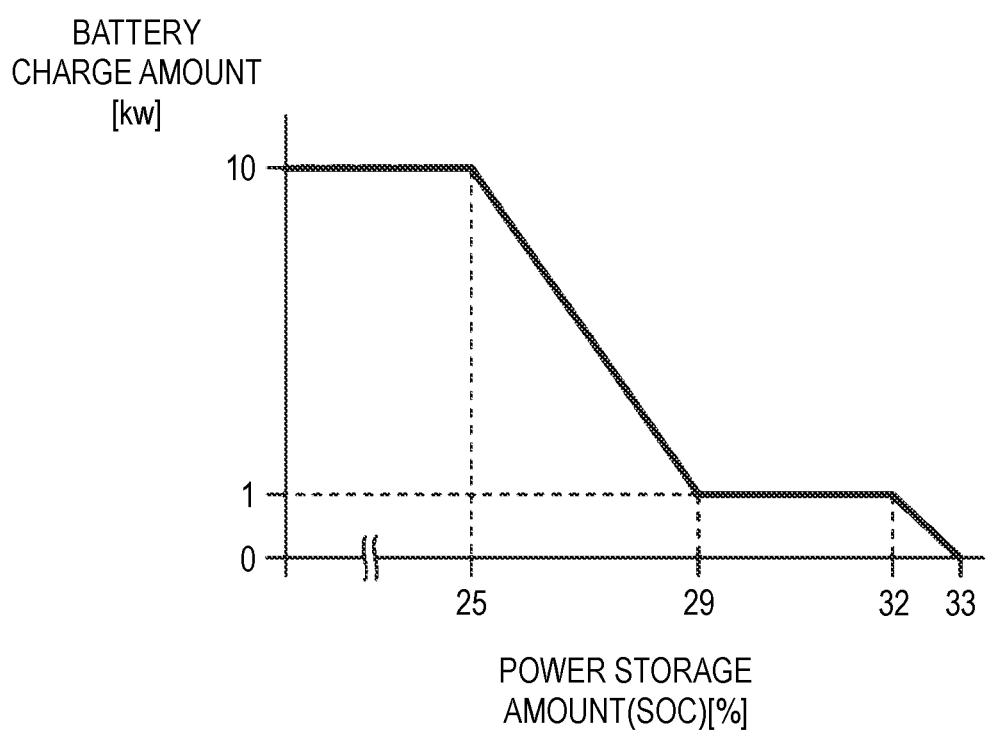
FIG. 3 is a view illustrating an example of a map showing a relationship between a charge remaining amount (SOC) and a battery charge amount used in the power generation control device according to the embodiment of the invention.

The vehicle speed detector 21 detects the vehicle speed of the vehicle 10. The vehicle speed information detected by the vehicle speed detector 21 includes stop information indicating that the vehicle speed is almost zero. The power storage amount information detector 22 detects power storage amount information including the power charge mode and the battery (cell) temperature in addition to the power storage amount (SOC) of the power storage device 13. In the power charge mode, for example, it is detected which one of the charge mode, the save mode, and the normal mode as described above. The heating request detector 23 detects a setting value of the heating intensity, for example, High, Middle, or Low, as the operating condition of the heater 16a in the air conditioner 16. The power generation information detector 24 detects power generation information of the generator 12. The power generation information is information necessary for calculating the power generation amount of the generator 12 and includes various pieces of information on auxiliary device power consumption information and power storage amount (remaining capacity) information. FIG. 3 is an example of a map indicating a relationship between the power storage amount (SOC) and the battery charge amount. In FIG. 3, although the target power storage amount is set to 33%, it is not limited to this.

The control unit 3 controls power generation and rattle suppression based on the detection result detected by the detection unit 2. For example, the control unit 3 may be configured as an Electronic Control Unit (ECU) of a vehicle and may perform power generation control and rattle suppression control as one of the controls executed by the ECU of the vehicle. The control unit 3 may be configured independently of the ECU of the vehicle.

The control unit 3 includes an arithmetic processor 31 including a CPU, a memory, a storage device (nonvolatile memory), an input/output circuit, a timer, and the like. The arithmetic processor 31 reads various data by the input/output circuit, performs arithmetic processing by the CPU using a program read from the storage device to the memory, and performs power generation control based on the processing result. In addition, in order to control the detection unit 2 and to execute the power generation control and the rattle suppression control, the control unit 3 is configured to include a detection unit controller 32, a power generation controller 33, and a rattle suppression controller 34.

The detection unit controller 32, the power generation controller 33, and the rattle suppression controller 34 are stored as, for example, a program in the storage device (nonvolatile memory) of the arithmetic processor 31. The program may be stored on the cloud and the arithmetic processor 31 may be appropriately communicated with the cloud to make it possible to use a desired program. In this case, the arithmetic processor 31 is configured to include a communication module with the cloud, an antenna, and the like.

The detection unit controller 32 controls the operation of the detection unit 2 (vehicle speed detector 21, power storage amount information detector 22, heating request detector 23, and power generation information detector 24). In the embodiment, under the control of the detection unit controller 32, the detection unit 2 acquires each piece of information of a detection target and provides the acquired information (data) to the detection unit controller 32. The detection unit controller 32 appropriately provides the provided information (data) to the power generation controller 33 and the rattle suppression controller 34 via the arithmetic processor 31.

Figure 4:
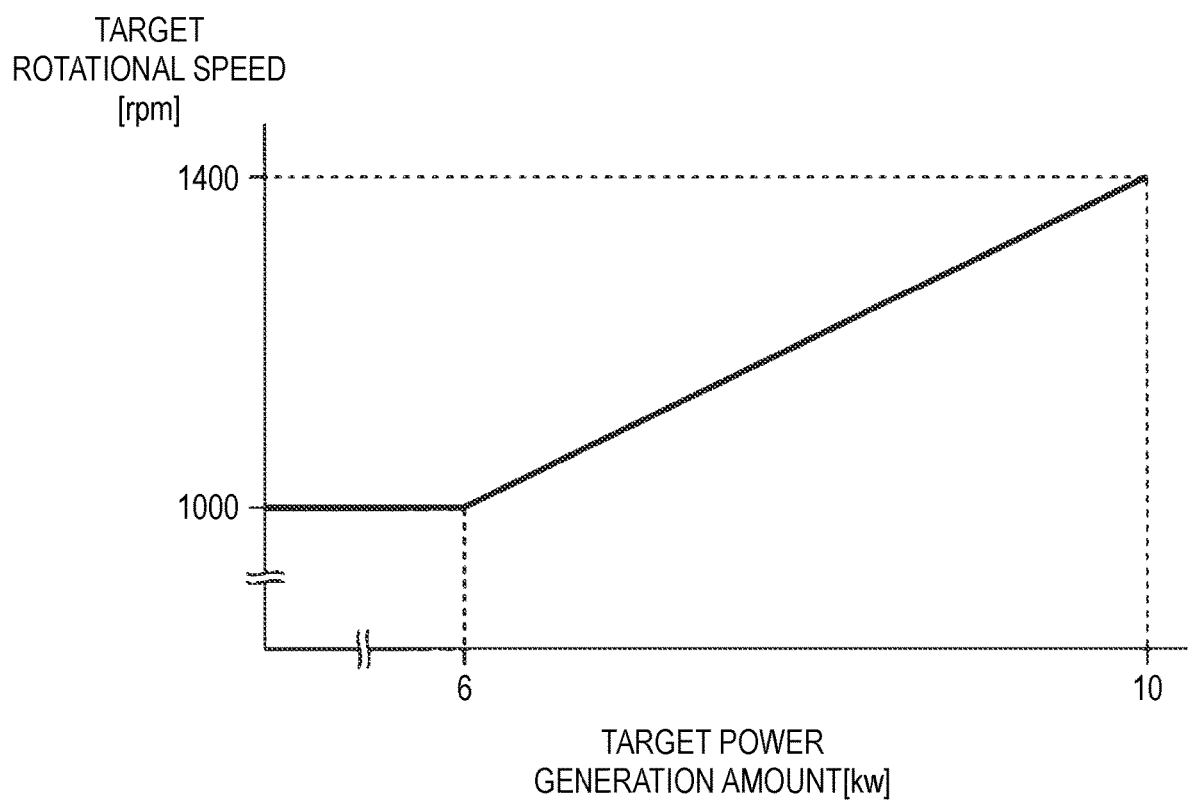
FIG. 4 is a view illustrating an example of a map showing a relationship between a power generation amount and an engine rotational speed used in the power generation control device according to the embodiment of the invention.

The power generation controller 33 calculates the amount of power for travelling based on the vehicle information detected by the detection unit 2 and sets the power generation amount (hereinafter referred to as a target power generation amount) to be generated by the generator 12. Further, the power generation controller 33 calculates the rotational speed of the engine 11 (hereinafter referred to as a target rotational speed) and the load torque of the generator 12 according to the set target power generation amount. FIG. 4 is an example of a map indicating a relationship between the target power generation amount of the generator 12 and the target rotational speed of the engine 11. The map is stored, for example, in the storage device of the arithmetic processor 31 and read out by the power generation controller 33 when calculating the target rotational speed of the engine 11. The power generation controller 33 obtains the target rotational speed corresponding to the target power generation amount of the read-out map.

Further, the power generation controller 33 calculates the torques of the engine 11 and the generator 12 based on the target rotational speed or the rattle suppression rotational speed described below (details will be described below).

The rattle suppression controller 34 determines a predetermined condition (hereinafter referred to as a rattle suppression control condition) for suppressing the rattling noise of the gear mechanism 15 based on the vehicle information detected by the detection unit 2 and the target power generation amount set by the power generation controller 33. The rattle suppression control condition is a condition indicating a situation where it is predicted that the rattling noise in the backlash of the gear mechanism 15 becomes remarkable (details will be described below).

As a result of the determination, when the rattle suppression control condition is satisfied, the rattle suppression controller 34 raises the target rotational speed of the engine 11 calculated by the power generation controller 33 to a predetermined rotational speed (hereinafter referred to as a rattle suppression rotational speed). On the other hand, when the rattle suppression control condition is not satisfied, the rattle suppression controller 34 maintains the target rotational speed at the rotational speed calculated by the power generation controller 33 without raising it to the rattle suppression rotational speed. The rattle suppression rotational speed is set as the rotational speed of the engine 11 which can mix the rattling noise with the engine sound and suppress the rattling noise from becoming remarkable even when the rattling noise is generated. The rattle suppression rotational speed is stored, for example, in the memory of the arithmetic processor 31 and is read out when raising the target rotational speed in engine rotational speed calculation processing as an argument (program parameter) of the power generation controller 33 described below.

Further, the rattle suppression controller 34 operates the engine 11 and the generator 12 according to the torques of the engine 11 and the generator 12 calculated by the power generation controller 33 (details will be described below).

Figure 5:
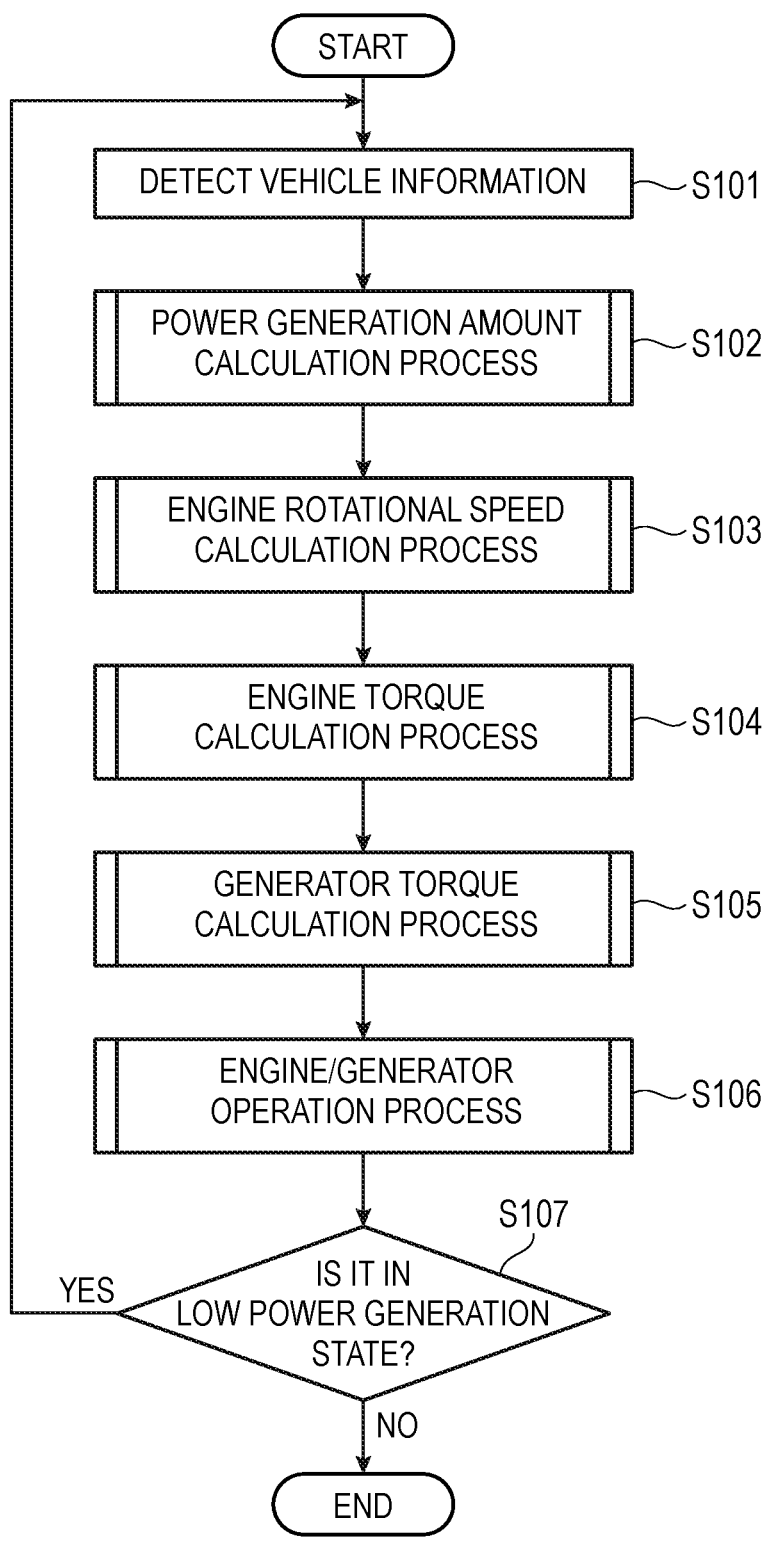
FIG. 5 is a diagram illustrating an entire flow of power generation control and rattle suppression control performed by the power generation control device according to the embodiment of the invention.

The power generation control device 1 having such a configuration performs the power generation control and the rattle suppression control of the vehicle 10 as follows. FIG. 5 illustrates the overall flow of the power generation control and the rattle suppression control performed by the power generation control device 1 in the embodiment. Hereinafter, the control by the power generation control device 1 and the operation thereof will be described according to the flow shown in FIG. 5.

Control by the power generation control device 1 is performed when the generator 12 is in a low power generation state. As such a low power generation state, for example, a case when the amount of power for travelling of the vehicle 10 is zero, that is, a case when the vehicle 10 is in a stopped state (the vehicle speed is zero) or a case when the accelerator is in an off state, is exemplified. Thus, while the amount of power for travelling is zero, the power generation control device 1 repeats the power generation control and the rattle suppression control. This determination will be described below as a final step (S107) of the control flow shown in FIG. 5.

As shown in FIG. 5, in performing the power generation control and the rattle suppression control, the detection unit 2 detects the vehicle information (S101). In the embodiment, the operation is controlled by the detection unit controller 32, where the vehicle speed detector 21 detects the vehicle speed and the power storage amount information detector 22 detects the power storage amount information, and further the heating request detector 23 detects the heating intensity and the power generation information detector 24 detects the power generation information.

In the low power generation state, the power generation control device 1 performs a power generation amount calculation process (S102), an engine rotational speed calculation process (S103), an engine torque calculation process (S104), a generator torque calculation process (S105), and an engine/generator operation process (S106) as described below. Each of those processes will be sequentially described below.

Figure 6:
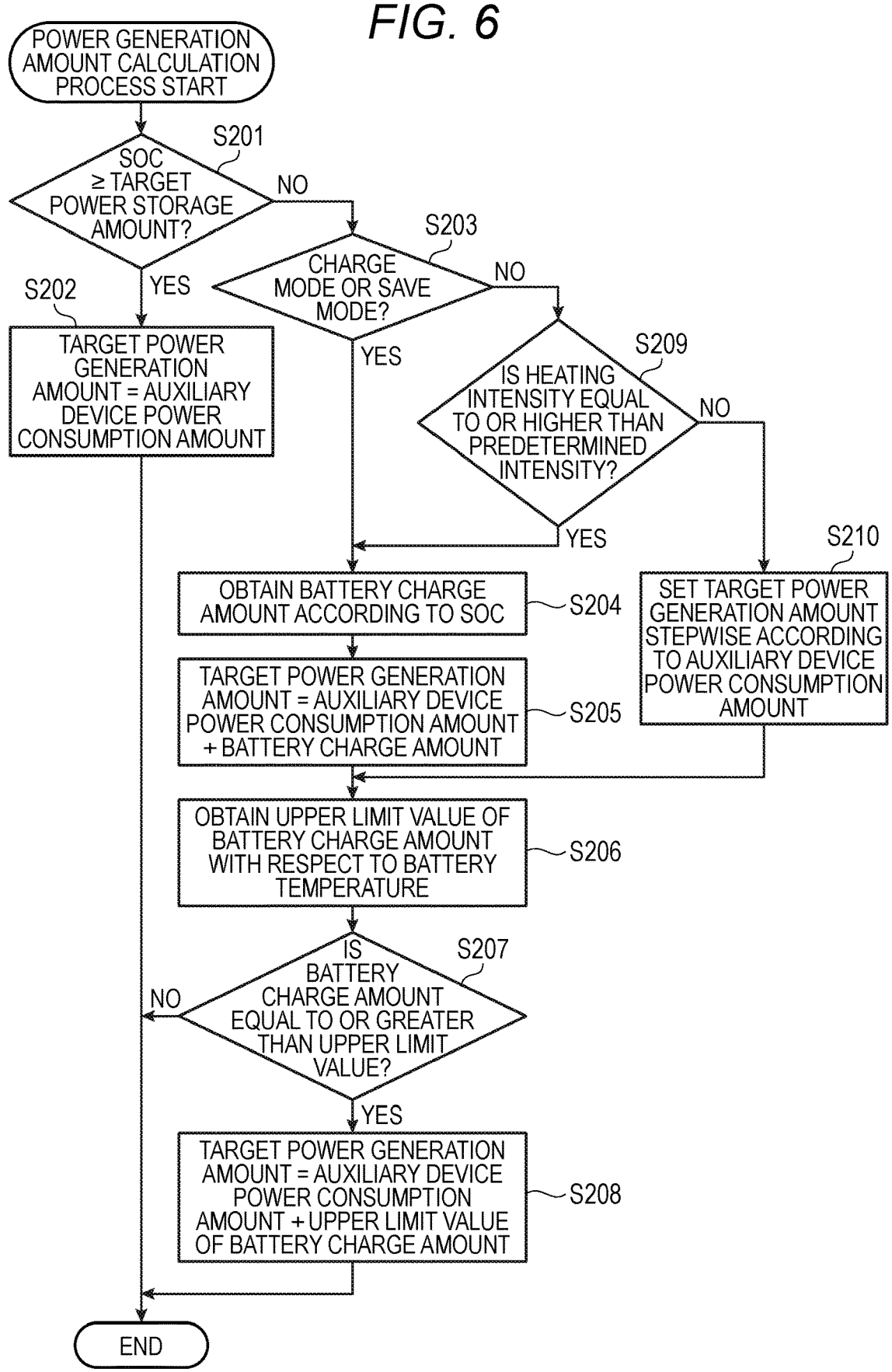
FIG. 6 is a diagram illustrating a control flow of a power generation amount calculation process performed by the power generation control device according to the embodiment of the invention.

FIG. 6 illustrates a control flow of the power generation amount calculation process (S102 shown in FIG. 5). The power generation amount calculation process is a process for calculating the target power generation amount of the generator 12. In the power generation amount calculation process, the power generation controller 33 determines the SOC based on the power storage amount (SOC) of the power storage device 13 detected by the power storage amount information detector 22 (S201). At this time, the power generation controller 33 compares the value of the SOC with the target power storage amount. The target power storage amount is stored, for example, in the memory of the arithmetic processor 31 and is read out at the time of SOC determination as an argument (program parameter) of power generation controller 33.

When the SOC is equal to or greater than the target power storage amount in S201, the power generation controller 33 sets the target power generation amount of the generator 12 to the value of the auxiliary device power consumption amount (S202). The value of the auxiliary device power consumption amount is detected by the power generation information detector 24 and given to the power generation controller 33 via the detection unit controller 32.

On the other hand, when the SOC is less than the target power storage amount in S201, the power generation controller 33 determines whether the power charge mode of the power storage device 13 detected by the power storage amount information detector 22 is the charge mode or the save mode (S203).

When the power charge mode is the charge mode or the save mode in S203, the power generation controller 33 obtains the battery charge amount for the power storage device 13 according to the SOC (S204). At this time, the power generation controller 33 reads out the map (FIG. 3) indicating the relationship between the power storage amount (SOC) and the battery charge amount and obtains the battery charge amount corresponding to the SOC of the read-out map. The target power storage amount (33%) of FIG. 3 is an example and different target power storage amounts are set in the charge mode and the save mode. For example, when it is assumed that the target power storage amount (33%) in FIG. 3 is a set value at the time of mode setting of the save mode, the power storage device 13 is charged to near a full charge state by raising the target power storage amount to about 90% in the charge mode.

Next, the power generation controller 33 sets the value of the target power generation amount of the generator 12 to a value obtained by adding the battery charge amount to the value of the auxiliary device power consumption amount (S205).

When the target power generation amount of the generator 12 is set in S205, the power generation controller 33 adjusts the target power generation amount based on the battery temperature of the power storage device 13 detected by the power storage amount information detector 22. At that time, the power generation controller 33 reads out a map (not illustrated) indicating the relationship between the battery temperature and the battery charge amount and obtains the battery charge amount corresponding to the battery temperature of the read-out map. The map in this case is a battery acceptance restriction map for limiting the battery charge amount according to the battery temperature and defines the upper limit value of the battery charge amount according to the battery temperature. The battery acceptance restriction map is stored, for example, in the storage device of the arithmetic processor 31 and read out by power generation controller 33 when adjusting the target power generation amount.

In the adjustment of the target power generation amount, the power generation controller 33 reads out the battery acceptance restriction map and obtains the upper limit value of the battery charge amount with respect to the battery temperature of the power storage device 13 (S206).

Next, the power generation controller 33 compares the upper limit value of the obtained battery charge amount with the value of the battery charge amount obtained in S204 (hereinafter referred to as a calculated value) (S207).

When the calculated value of the battery charge amount is equal to or greater than the upper limit value in S207, the power generation controller 33 changes the setting of the value of the target power generation amount of the generator 12 to a value obtained by adding the upper limit value of the battery charge amount to the value of the auxiliary device power consumption amount (S208). This prevents the battery charge amount at the target power generation amount from exceeding the upper limit value. For example, when the battery temperature of the power storage device 13 is a cryogenic temperature, charging with excessive power can be prevented, thereby battery deterioration can be suppressed. On the other hand, when the calculated value of the battery charge amount does not reach the upper limit value in S207, the power generation controller 33 maintains the value of the target power generation amount of the generator 12 at the value obtained by adding the calculated value of the battery charge amount to the value of the auxiliary device power consumption amount (S204).

When the power charge mode is (is the normal mode) not the charge mode or the save mode in S203, the power generation controller 33 determines whether the heating intensity of the heater 16a detected by the heating request detector 23 is equal to or higher than a predetermined intensity (S209). The predetermined intensity is a heating intensity which requires a sufficient heat source, that is, a high amount of heat required. The predetermined intensity is stored, for example, in the memory of arithmetic processor 31 and is read out as an argument (program parameter) of the power generation controller 33 when determining the heating intensity.

When the heating intensity is equal to or higher than the predetermined intensity in S209, the power generation controller 33 obtains the battery charge amount (S204) and sets the value of the target power generation amount of the generator 12 to a value obtained by adding the battery charge amount to the value of the auxiliary device power consumption amount (S205). Further, the set target power generation amount is adjusted in accordance with the battery temperature of the power storage device 13 (S206 to S208).

Figure 7A:
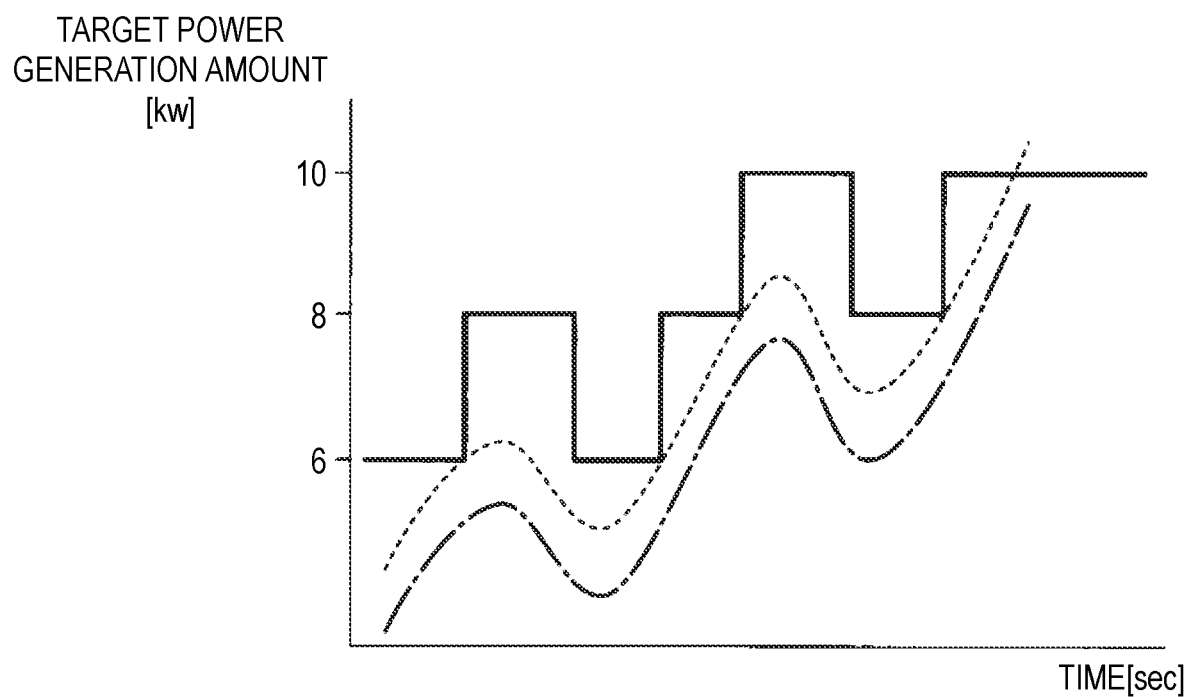
Figure 7B:
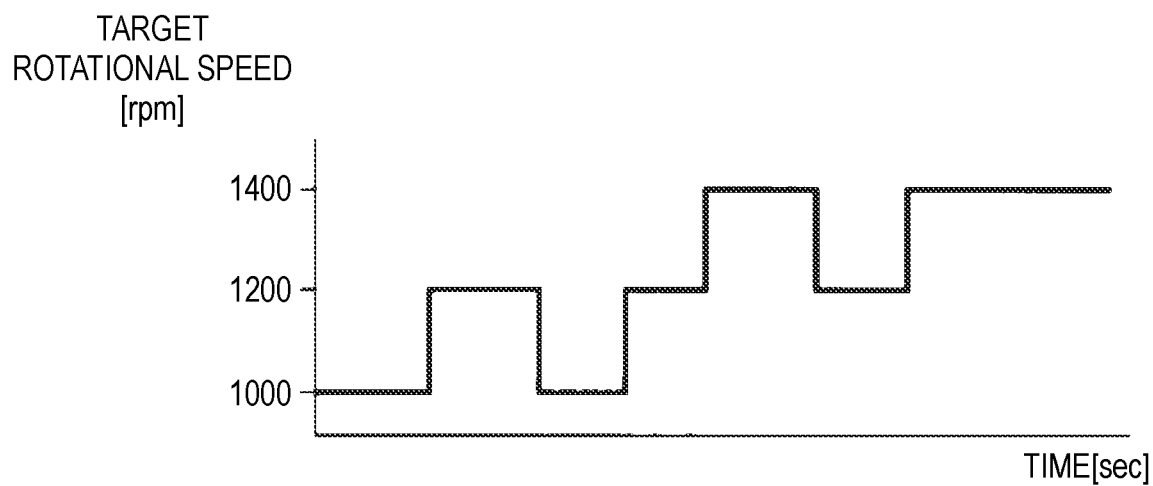

On the other hand, when the heating intensity is not equal to or higher than the predetermined intensity in S209 (the heater 16a is not operated or it is the heating intensity where the amount of heat required is not high compared to that of the predetermined intensity), the power generation controller 33 sets the target power generation amount of the generator 12 to be switched stepwise based on the fluctuation in the auxiliary device power consumption amount (S210). FIGS. 7A and 7B illustrate, as an example, respective fluctuation aspects in a case where the target power generation amount and the target rotational speed of the engine 11 are switched stepwise in this way. FIG. 7A is a view illustrating the fluctuation aspect of the power generation amount and FIG. 7B is a view illustrating the fluctuation aspect of the target rotational speed, in which the target rotational speed is set based on the map indicating the relationship between the target power generation amount and the target rotational speed of FIG. 4.

In the example illustrated in FIG. 7A, the target power generation amount is offset (upset) so as to increase the target power generation amount more than the auxiliary device power consumption amount and the target power generation amount is varied in three steps. FIG. 7B illustrates an example of a stepwise switching mode of the target rotational speed corresponding to the stepwise switching of the target power generation amount (FIG. 7A). Thus, by switching the target rotational speed in a stepwise manner, even when the auxiliary device power consumption amount fluctuates, it is possible to suppress the fluctuation in the target rotational speed accompanying the fluctuation.

In FIG. 7A, a one dot chain line is a curve illustrating the time transition of the auxiliary device power consumption amount and a broken line is a curve illustrating the time transition of the target power generation amount offset (shifted) so as to increase the value of the auxiliary device power consumption amount indicated by the one dot chain line. The solid line indicates the time transition of the target power generation amount switched in a stepwise manner based on the offset value of the target power generation amount indicated by the broken line. In this case, the upper stage value, the lower stage value, and the middle stage value of the target power generation amount are set and the target power generation amount is transitioned stepwise to those three values. For example, as illustrated in FIG. 7A, when the value (hereinafter referred to as the offset value) indicated by the broken line increases beyond the lower stage value, the value (power generation amount) indicated by the solid line is raised from the lower stage value to the middle stage value, and then when the offset value is reduced below the lower stage value, the target power generation amount is set as the lower stage value. When the offset value increases from the middle stage value to a value beyond the upper stage value, the target power generation amount is increased from the middle stage value to the upper stage value, and then the target power generation amount is reduced to the middle stage value when the offset value is reduced below the middle stage value.

Further, when the target power generation amount is reduced, hysteresis is provided. For example, when the target power generation amount is raised from the middle stage value to the upper stage value, the threshold of the offset value is 8 kW, but when the target power generation amount is reduced from the upper stage value to the middle stage value, the threshold of the offset value is 7 kW. Further, when the target power generation amount is raised from the lower stage value to the middle stage value, the threshold of the offset value is 6 kW, but when the target power generation amount is lowered from the middle stage value to the lower stage value, the threshold of the offset value is 5 kW.

The target rotational speed is switched stepwise as illustrated in FIG. 7B, corresponding to the time transition of the target power generation amount indicated by the solid line in FIG. 7A. In this case, the upper stage value, the lower stage value, and the middle stage value of the target rotational speed are set and the target rotational speed is transitioned stepwise to those three values. The upper stage value, the lower stage value, and the middle stage value of the target rotational speed are transitioned in a state where the values are respectively linked to the upper stage value, the lower stage value, and the middle stage value of the target power generation amount.

In the embodiment, as an example, the target power generation amount is divided into three stages where the upper stage value of the target power generation amount is 10 kW and the lower stage value is 6 kW, and further the middle stage value is 8 kW and the target rotational speed is divided into three stages where the upper stage value of the target rotational speed is 1400 rpm and the lower stage value is 1000 rpm, and further the middle value is 1200 rpm. However, the target power generation amount and the target rotational speed are not limited to those values and stages. That is, the target power generation amount may be set to be switched stepwise according to the auxiliary device power consumption amount and the target power generation amount may be configured so as not to be reduced below the auxiliary device power consumption amount. As a result, it is possible to suppress the decrease in the SOC of the power storage device 13 and to suppress the fluctuation in the engine rotational speed (the actual rotational speed of the engine 11).

When the target power generation amount of the generator 12 is set stepwise in S210, as in a case where the target power generation amount of the generator 12 is set in S205, the power generation controller 33 adjusts the target power generation amount based on the battery temperature of the power storage device 13.

When the target power generation amount is adjusted, the power generation controller 33 obtains the upper limit value of the battery charge amount with respect to the battery temperature of the power storage device 13 (S206) and compares the obtained upper limit value of the battery charge amount with the calculated value of the battery charge amount (S207). When the calculated value of the battery charge amount is equal to or greater than the upper limit value in S207, the power generation controller 33 changes the setting of the value of the target power generation amount of the generator 12 to a value obtained by adding the upper limit value of the battery charge amount to the value of the auxiliary device power consumption amount (S208). On the other hand, when the calculated value of the battery charge amount has not reached the upper limit value, the power generation controller 33 maintains the value of the target power generation amount of the generator 12 set in S210.

When the target power generation amount of the generator 12 is set, the power generation control device 1 performs an engine rotational speed calculation process (S103 shown in FIG. 5).

Figure 8:
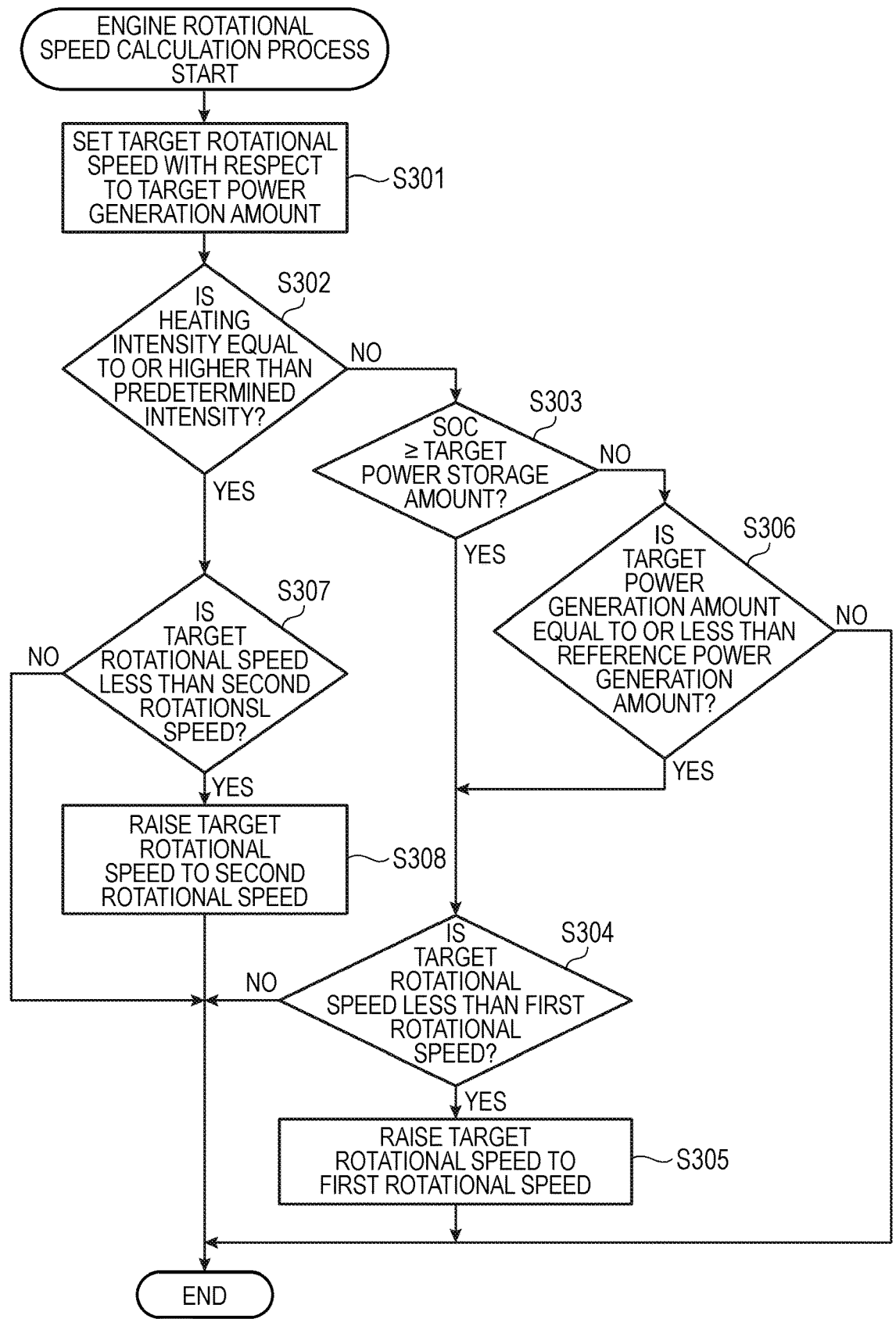
FIG. 8 is a diagram illustrating a control flow of an engine rotational speed calculation process performed by the power generation control device according to the embodiment of the invention.

FIG. 8 illustrates a control flow of the engine rotational speed calculation process (S103). The engine rotational speed calculation process is a process which calculates the target rotational speed of the engine 11 based on the target power generation amount of the generator 12 and raises the target rotational speed to the rattle suppression rotational speed when the rattle suppression control condition is satisfied.

In the engine rotational speed calculation process, the power generation controller 33 sets a target rotational speed of the engine 11 with respect to the set target power generation amount of the generator 12 (S301). In this case, the power generation controller 33 reads out the map (FIG. 4) indicating the relationship between the target power generation amount and the target rotational speed and obtains a target rotational speed corresponding to the target power generation amount of the read-out map.

When the target rotational speed is set by the power generation controller 33, the rattle suppression controller 34 determines the rattle suppression control condition. The rattle suppression control condition is a condition for determining whether to execute the rattle suppression control. When the rattle suppression control condition is satisfied, the rattling noise may occur in the gear mechanism 15 as the load torque of the generator 12 decreases at the time of power generation. In the embodiment, as described below, the heating intensity of the heater 16a, the power storage amount (SOC) of the power storage device 13, and the target power generation amount are applied as determination targets of the rattle suppression control condition.

In the rattle suppression control, the rattle suppression controller 34 determines whether the heating intensity of the heater 16a is equal to or higher than the predetermined intensity (S302).

When the heating intensity is not equal to or higher than the predetermined intensity in S302 (the heater 16a is not operated or it is the heating intensity where the amount of heat required is not high compared to that of the predetermined intensity), the rattle suppression controller 34 compares the power storage amount (SOC) of the power storage device 13 with the target power storage amount (S303). The target power storage amount is stored, for example, in the memory of arithmetic processor 31 and is read out at the time of SOC determination as an argument (program parameter) of rattle suppression controller 34.

When the SOC is equal to or greater than the target power storage amount in S303, the rattle suppression controller 34 compares the target rotational speed of the engine 11 set in S301 with a first rotational speed (S304). The first rotational speed is a rattle suppression rotational speed which can cause the rattling noise to be mixed with the engine sound and can prevent the rattling noise from becoming remarkable and the rotational speed less than the first rotational speed is a rotational speed of the engine 11 where the engine sound is small and the rattling noise can be remarkable when the rattling noise occurs. Further, the first rotational speed is a target rotational speed of the engine 11 corresponding to the target power generation amount of the generator 12 which can only cover the auxiliary device power consumption amount. The first rotational speed is stored, for example, in the memory of arithmetic processor 31 and read out as an argument (program parameter) of the rattle suppression controller 34 when the target rotational speed is raised.

In S304, when the target rotational speed set in S301 is less than the first rotational speed, the rattle suppression controller 34 raises the target rotational speed of the engine 11 to the first rotational speed (S305). As described above, when the SOC is equal to or greater than the target power storage amount, the target power generation amount of the generator 12 is set to the value of the auxiliary device power consumption amount (S202 shown in FIG. 6). Therefore, even when the target rotational speed of the engine 11 set in S301 is set to be less than the first rotational speed in accordance with the fluctuation in the auxiliary device power consumption amount, the rotational speed of the engine 11 is increased to the first rotational speed, and thus it is possible to suppress the rattling noise from becoming remarkable.

On the other hand, when the target rotational speed is equal to or higher than the first rotational speed in S304, the rattle suppression controller 34 maintains the target rotational speed of the engine 11 at the value (S301) set by the power generation controller 33.

On the contrary, when the SOC is less than the target power storage amount in S303, the rattle suppression controller 34 compares the target power generation amount of the generator 12 with a predetermined value (hereinafter referred to as a reference power generation amount) (S306). The reference power generation amount is a value of the power generation amount at which the load torque of the generator 12 becomes almost zero as the power generation amount decreases and the rattling noise can occur in the gear mechanism 15. The reference power generation amount is stored, for example, in the memory of arithmetic processor 31 and is read out as an argument (program parameter) of the rattle suppression controller 34 when the target power generation amount is determined.

When the target power generation amount is equal to or less than the reference power generation amount in S306, the rattle suppression controller 34 compares the target rotational speed of the engine 11 with the first rotational speed (S304). Then, when the target rotational speed is less than the first rotational speed, the target rotational speed is raised to the first rotational speed (S305), and when the target rotational speed is equal to or greater than the first rotational speed, the target rotational speed is maintained at the value (S301) set by the power generation controller 33.

In addition, even when the target power generation amount exceeds the reference power generation amount in S306, the rattle suppression controller 34 maintains the target rotational speed of the engine 11 at the value (S301) set by the power generation controller 33. In this case, the power generation controller 33 has a power generation mode in which the target rotational speed of the engine 11 is set to be less than the first rotational speed while switching the target power generation amount of the generator 12 stepwise based on, for example, the fluctuation in the auxiliary machine power consumption. Even when the power generation controller 33 sets such a power generation mode, if the target power generation amount is equal to or less than the reference power generation amount in S306, the rattle suppression controller 34 raises the target rotational speed to the first rotational speed.

Further, when the heating intensity is equal to or higher than the predetermined intensity in S302, the rattle suppression controller 34 compares the target rotational speed of the engine 11 set in S301 with a second rotational speed (S307). When the target rotational speed is less than the second rotational speed, the rattle suppression controller 34 raises the target rotational speed of the engine 11 to the second rotational speed (S308). The second rotational speed is a rattling suppression rotational speed corresponding to the set target rotational speed and is set to a rotational speed higher than the first rotational speed. The second rotational speed is, for example, a target rotational speed capable of securing the amount of heat necessary when the heating intensity is equal to or higher than a predetermined intensity by the rotation of the engine 11. The second rotational speed is stored, for example, in the memory of arithmetic processor 31 and is read out when raising the target rotational speed as an argument (program parameter) of rattle suppression controller 34.

As a result, when the heating intensity is equal to or higher than the predetermined intensity, the target rotational speed of the engine 11 can be made higher than the first rotational speed, so the heat source of the heater 16a can be secured more reliably and the rattling noise can be suppressed from becoming remarkable. For example, even in either case of a situation where the target rotational speed is set to the first rotational speed or a situation where the power generation mode described above is set and the target rotational speed is set to be less than the first rotational speed, when the heating intensity of the heater 16a is equal to or higher than the predetermined intensity, the target rotational speed can be raised to the second rotational speed.

On the other hand, when the target rotational speed set in S301 is equal to or higher than the second rotational speed in S307, the rattle suppression controller 34 maintains the target rotational speed of the engine 11 at the value (S301) set by the power generation controller 33.

When the target rotational speed of the engine 11 is set, the power generation control device 1 performs the engine torque calculation process (S104 shown in FIG. 5).

Figure 9:
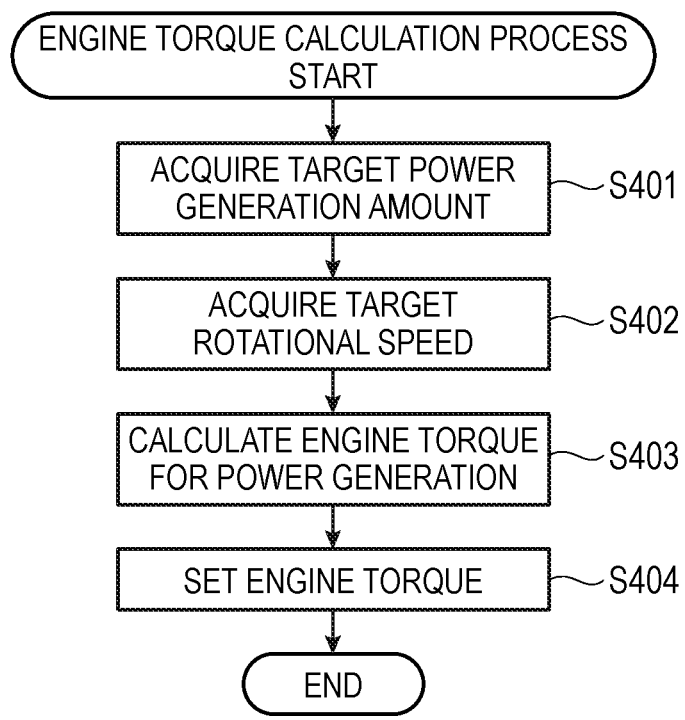
FIG. 9 is a diagram illustrating a control flow of an engine torque calculation process performed by the power generation control device according to the embodiment of the invention.

FIG. 9 illustrates a control flow of the engine torque calculation process (S104). The engine torque calculation process is a process to calculate the torque (hereinafter referred to as an engine torque) of the engine 11 based on the target rotational speed.

In the engine torque calculation process, the power generation controller 33 acquires the target power generation amount of the generator 12 set in the power generation amount calculation process (S102 shown in FIG. 5) (S401) and acquires the target rotational speed of the engine 11 set in the engine rotational speed calculation process (S103 shown in FIG. 5) (S402).

The power generation controller 33 divides the target power generation amount by the target rotational speed and calculates a value (hereinafter referred to as an engine torque for power generation) multiplied by a predetermined coefficient (constant) (S403). The engine torque for power generation corresponds to the torque (load torque of the generator 12) required for power generation at the generator 12.

Then, the power generation controller 33 sets the value of the engine torque to a value obtained by adding a friction torque of the engine 11 to the engine torque for power generation (S404). The friction torque is a torque in a regenerative direction generated due to a rotational resistance or the like by the friction generated between a piston and a cylinder when the engine 11 rotates.

When the engine torque is set, the power generation control device 1 performs the generator torque calculation process (S105 shown in FIG. 5).

Figure 10:
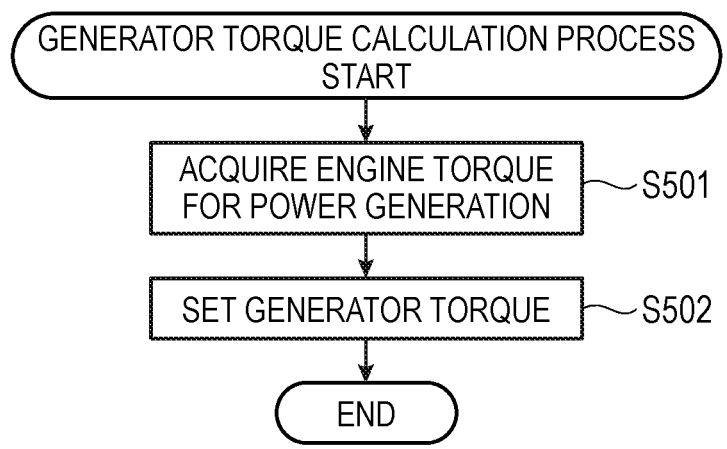
FIG. 10 is a diagram illustrating a control flow of a generator torque calculation process performed by the power generation control device according to the embodiment of the invention.

FIG. 10 illustrates a control flow of the generator torque calculation process (S105). The generator torque calculation process is a process for calculating the torque (hereinafter referred to as a generator torque) of the generator 12 based on the engine torque for power generation. The generator torque is the torque (load torque) applied to the generator 12 during power generation.

In the generator torque calculation process, the power generation controller 33 acquires the engine torque for power generation calculated in the engine torque calculation process (S104 shown in FIG. 5) (S501).

The power generation controller 33 sets the value of the generator torque to a value obtained by multiplying the gear ratio of the gear mechanism 15 by the engine torque for power generation (S502). The gear ratio is a gear ratio of the generator 12 to the engine 11 and is a constant value in the embodiment.

When the generator torque is set, the power generation control device 1 performs the engine/generator operation process (S106 in FIG. 5).

Figure 11:
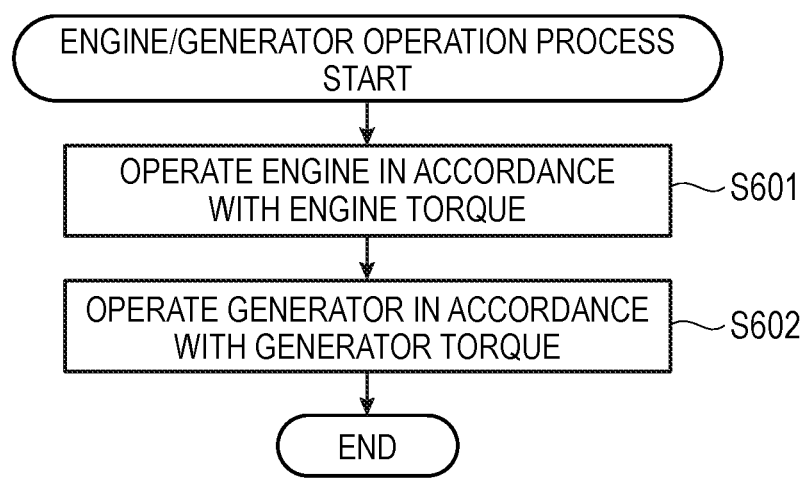
FIG. 11 is a diagram illustrating a control flow of an engine/generator operation process performed by the power generation control device according to the embodiment of the invention.

FIG. 11 illustrates a control flow of the engine/generator operation process. The engine/generator operation process is a process of operating the engine 11 according to the engine torque and operating the generator 12 according to the generator torque.

In the engine/generator operation process, the rattle suppression controller 34 acquires the value of the engine torque set in the engine torque calculation process (S104 shown in FIG. 5) and operates the engine 11 according to the acquired value of the engine torque (S601). In this case, the rattle suppression controller 34 operates the engine 11 so that the output torque of the engine 11 becomes the engine torque by controlling, for example, the opening degree of a throttle valve of the engine 11 or the like.

The rattle suppression controller 34 acquires the value of the generator torque set in the generator torque calculation process (S105 shown in FIG. 5) and operates the generator 12 according to the acquired value of the generator torque (S602). In this case, the rattle suppression controller 34 operates the generator 12 so that the load torque of the generator 12 becomes the generator torque by controlling, for example, an inverter (not illustrated) of the generator 12.

After the engine 11 and the generator 12 are operated in the engine/generator operation process, as illustrated in FIG. 5, the rattle suppression controller 34 determines whether the generator 12 is in a low power generation state (S107). The low power generation state corresponds to a case where the vehicle 10 is in the stop state (the vehicle speed is zero) or the accelerator is in an off state. In the embodiment, the rattle suppression controller 34 determines whether the amount of power for travelling detected by the power generation information detector 24 is zero.

When the amount of power for travelling is zero, the power generation control and the rattle suppression control of the vehicle 10 are continued. That is, while the amount of power for travelling is zero, the power generation control device 1 repeats the power generation control and the rattle suppression control. In this case, the detection unit 2 continues detection of vehicle information and the power generation controller 33 and the rattle suppression controller 34 repeat the control from S102 as appropriate. On the other hand, when the amount of power for travelling is not zero, the power generation controller 33 and the rattle suppression controller 34 finish the power generation control and the rattle suppression control of the vehicle 10.

Thus, according to the power generation control device 1 of the embodiment, when the generator 12 is in a low power generation state, even if the load torque of the generator 12 decreases to almost zero, the engine rotational speed can be increased to the rattle suppression rotational speed if the rattle suppression control condition is satisfied. Therefore, it is possible to suppress the rattling noise from becoming remarkable by mixing the rattling noise with the engine sound. As a result, it is possible to suppress a situation where a user misinterprets the rattling noise as failure of the vehicle 10.

For example, when the power generation amount for travelling is zero, such as when the vehicle 10 is stopped (the vehicle speed is zero) or when the accelerator is in an off state, the target power generation amount and the target rotational speed can be switched stepwise. Therefore, even when the auxiliary device power consumption amount fluctuates, it is possible to suppress the fluctuation of the engine rotational speed (actual rotational speed of the engine 11) due to the fluctuation. As a result, it is possible to suppress a situation in which a user feels a sense of uncomfortable feeling that the engine 11 makes a discomfort noise.

Figure 12A:
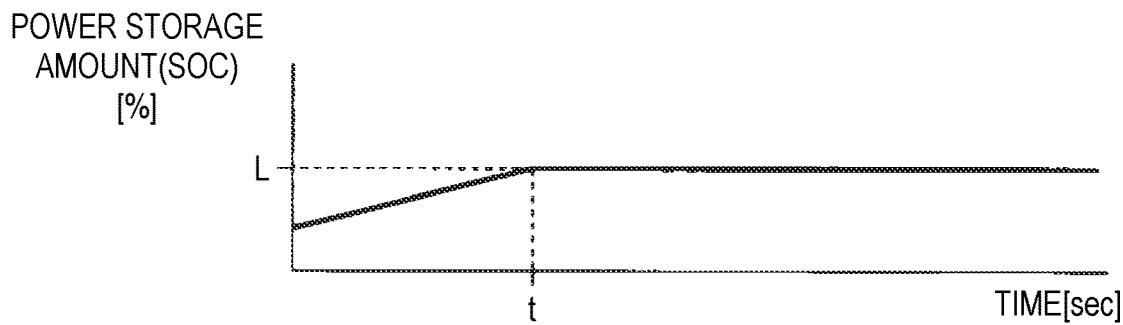
Figure 12B:
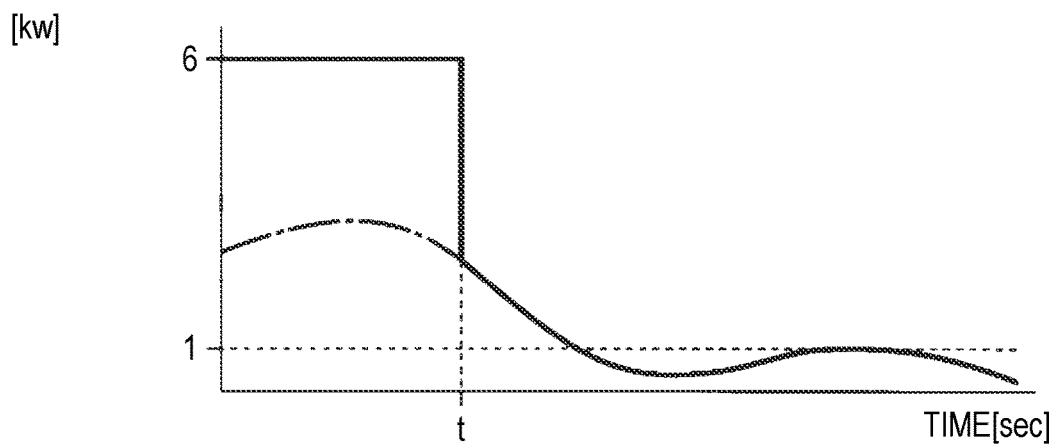
Figure 12C:
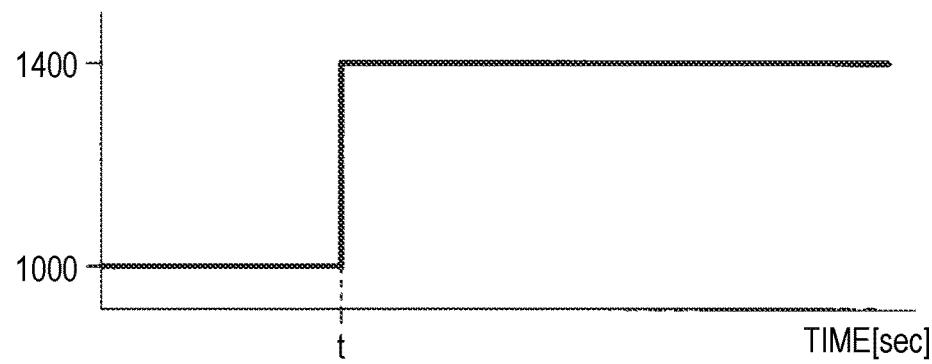

In FIGS. 12A to 12C, as an example of the rattle suppression control in the power generation control device 1, fluctuation aspects in a case where the target power generation amount of the generator 12 is decreased while the target rotational speed of the engine 11 is increased when the SOC reaches the target power storage amount are illustrated. FIG. 12A illustrates a fluctuation aspect of the SOC and FIG. 12B illustrates a fluctuation aspect of the target power generation amount, and further FIG. 12C illustrates a fluctuation aspect of the target rotational speed. In FIG. 12B, a solid line is a locus indicating the time transition of the power generation amount and a one dot chain line is a curve indicating the time transition of the auxiliary device power consumption amount. After the SOC reaches the target power storage amount, the locus (solid line) of the target power generation amount overlaps with the curve (one dot chain line) of the auxiliary device power consumption amount.

In the examples illustrated in FIGS. 12A and 12B, the target power generation amount of the generator 12 is maintained at a constant value (for example, the lower stage value of the target power generation amount described above) and the target rotational speed of the engine 11 is maintained at a constant value (for example, the lower stage value of the target rotational speed described above until the SOC of the power storage device 13 reaches (time t) the target power storage amount (value L). Then, when the SOC reaches (time t) the target power storage amount (value L), the target power generation amount decreases to the auxiliary device power consumption amount. In synchronization with this, as illustrated in FIG. 12C, the target rotational speed is increased to the rattle suppression rotational speed (for example, 1400 rpm).

Hereinbefore, the embodiment of the invention is described. However, the embodiment described above is explained as an example and it is not intended to limit the scope of invention. Such a novel embodiment can be implemented in various other forms and various omissions, substitutions, and modifications can be made without departing from the scope of the invention. Those embodiments and modifications thereof are included in the scope and the gist of the invention and are included in the invention described in the claims and the equivalents thereof

What is claimed is:

1. A power generation control device, comprising:
an internal combustion engine of a vehicle;
a generator driven by the internal combustion engine to generate electricity;
a power storage device charged by the generator;
a gear mechanism that interconnects the internal combustion engine and the generator;
a detector configured to detect vehicle information of the vehicle;
a power generation controller that sets a target power generation amount of the generator based on the vehicle information and calculates a target rotational speed of the internal combustion engine and a load torque of the generator according to the target power generation amount; and
a rattle suppression controller which determines whether a rattle suppression control condition of the gear mechanism is satisfied or not based on the target power generation amount and raises the target rotational speed of the internal combustion engine to a predetermined rotational speed when the condition is satisfied,
wherein the rattle suppression controller is configured to:
compare a power storage amount of the power storage device with a target power storage amount;
compare the target rotational speed with the predetermined rotational speed, when the power storage amount is equal to or greater than the target power storage amount; and
raise the target rotational speed to the predetermined rotational speed when the target rotational speed is less than the predetermined rotational speed,
the power generation controller has a power generation mode where, when the vehicle is in a stopped state and the power storage amount of the power storage device is less than the target power storage amount, the target power generation amount is set stepwise according to an auxiliary device power consumption amount and the target rotational speed of the internal combustion engine is set to be less than the predetermined rotational speed;
the rattle suppression controller determines that the condition is satisfied when the target power generation amount is equal to or less than a reference power generation amount even in a state where the power generation mode is set and raises the target rotational speed of the internal combustion engine to the predetermined rotational speed; and
the reference power generation amount is a value of a power generation amount at which the load torque of the generator becomes almost zero in accordance with a decrease in the power generation amount and at which a rattling noise can occur in the gear mechanism.

2. The power generation control device according to claim 1, wherein
  the vehicle information includes stop information of the vehicle, power storage amount information of the power storage device, and auxiliary device power consumption information of the vehicle,
  the power generation controller sets the target power generation amount to be the auxiliary device power consumption amount when the vehicle is in the stopped state and the power storage amount of the power storage device is equal to or more than a target power storage amount, and
  the rattle suppression controller determines that the condition is satisfied when the target power generation amount is set to be the auxiliary device power consumption amount and raises the target rotational speed of the internal combustion engine to a first rotational speed.

3. The power generation control device according to claim 1, wherein
  the vehicle information further includes heating intensity of an air conditioner of the vehicle, and
  the rattle suppression controller determines whether the condition is satisfied or not based on the target power generation amount and the vehicle information, and when the heating intensity of the air conditioner is equal to or higher than a predetermined intensity, determines the condition is satisfied and raises the target rotational speed of the internal combustion engine to a second rotational speed higher than the first rotational speed.

4. The power generation control device according to claim 3, wherein
  the rattle suppression controller raises the target rotational speed of the internal combustion engine to the second rotational speed when the heating intensity of the air conditioner is equal to or higher than the predetermined intensity even in a case of a situation where the target rotational speed of the internal combustion engine is set to the first rotational speed or a situation where the power generation mode is set and the target rotational speed of the internal combustion engine is set to be less than the first rotational speed.

5. The power generation control device according to claim 1, wherein the rattle suppression controller maintains the target rotational speed of the internal combustion engine at a constant value without changing the target rotational speed, when the target power generation amount exceeds the reference power generation amount.

\* \* \* \* \*